(12) United States Patent
Bussinger et al.

(10) Patent No.: US 8,776,932 B1
(45) Date of Patent: Jul. 15, 2014

(54) FOLDABLE ELECTRIC CART

(71) Applicants: Allen Bussinger, Saginaw, MI (US); Jeffrey R. Frahm, Frankenmuth, MI (US)

(72) Inventors: Allen Bussinger, Saginaw, MI (US); Jeffrey R. Frahm, Frankenmuth, MI (US)

(73) Assignee: Amigo Mobility International, Inc., Bridgeport, MI (US)

( * ) Notice: Subject to any disclaimer, the term of this patent is extended or adjusted under 35 U.S.C. 154(b) by 0 days.

(21) Appl. No.: 13/759,469

(22) Filed: Feb. 5, 2013

Related U.S. Application Data

(60) Provisional application No. 61/595,559, filed on Feb. 6, 2012.

(51) Int. Cl.
*B62D 61/08* (2006.01)
*B62K 15/00* (2006.01)

(52) U.S. Cl.
USPC .......................................... 180/208; 180/213

(58) Field of Classification Search
CPC .......... B62K 5/023; B62K 5/025; B62K 5/06; B62K 5/07; B62K 15/00; B62K 15/006; B62K 15/008; B62K 2015/001; A61G 5/08; A61G 5/042; B62D 61/08
USPC .................................................. 180/208, 213
See application file for complete search history.

(56) References Cited

U.S. PATENT DOCUMENTS

| 7,451,848 B2 * | 11/2008 | Flowers et al. | 180/208 |
| 7,926,606 B2 * | 4/2011 | Wang | 180/208 |
| 2004/0256164 A1 * | 12/2004 | Huang | 180/65.1 |
| 2009/0020350 A1 * | 1/2009 | Wu | 180/208 |
| 2013/0062846 A1 * | 3/2013 | Hsiao | 280/87.05 |

* cited by examiner

*Primary Examiner* — Ruth Ilan
(74) *Attorney, Agent, or Firm* — Robert L. Farris; Farris Law, P.C.

(57) ABSTRACT

The foldable electric cart has a frame supported by two rear wheels and a steerable and motor driven front wheel. A seat is mounted on the rear portion of the frame. The seat is supported by left and right rear arms and left and right front arms. The arms pivot the seat between a horizontal use position above the rear wheels and horizontal folded position on a foot support plate. A seat back rest is pivoted relative to the seat between an upright position and a horizontal position. A yoke, holding a hub motor and driven wheel, is fixed to a steering tube journaled in a housing. The housing is pivotable about a transverse horizontal axle. A steering handle base and handle is clamped to the steering tube. The housing pivots from an upright position to a storage position with steering handles to the rear of the folded horizontal seat.

15 Claims, 9 Drawing Sheets

FOLDABLE ELECTRIC CART

TECHNICAL FIELD

The electric cart has a frame supported by two rear wheels, a driven steerable front wheel, a foldable and adjustable rear seat, and a front wheel and steering tiller pivotally attached to the frame by trunnions having a transverse axis that permits pivotal movement between a generally vertical operating position and a storage position above the folded seat and the rear wheels.

BACKGROUND OF THE INVENTION

Electric powered carts with two rear wheels, a driven and steered front wheel and a rear seat are commercially available. The seat is mounted above the rear wheels. The seat is generally fixed relatively to a cart frame. These carts require substantial space. Transportation to places of use of three wheeled carts depends on the vehicle to be used. Cars have been equipped with a platform at the rear of their rear bumper. A ramp extending to one side of the platform has been employed to guide a cart up onto the platform. Masts and winch systems have also been employed to lift carts onto and from rear mounted platforms. The cart must be attached to the platform during transport. Anchoring and releasing a cart from a platform can be difficult for physically challenged individuals. A platform attached to the rear of a vehicle increases the length of vehicle. The cart on a vehicle rear mounted platform is exposed to rain, snow, dust and dirt. Upon arrival at a potential use area, a cart transported on a rear mounted platform may be too dirty to use. Cleaning takes time and equipment. Water for cleaning may not be available where a cart is to be used.

Three and four wheeled carts may be transported in a clean dry environment in some vans and sport utility vehicles. Ramps or lift devices are needed to load and unload carts that are transported in vans and SUVs. Modifications of the vans and SUVs may be required in addition to adding ramps or lift devices. These modifications increase the cost of expensive vans and SUVs. Parking and storage of vans, SUVs and other large vehicles is expensive and may not be easily available in cities and large towns.

SUMMARY OF THE INVENTION

The foldable electric cart of this invention has a low center of gravity to provide stability. The cart can be stored inside a home or apartment. The cart in a folded condition can be transported in the trunk or rear seat area of most automobiles employed in North American and in other places.

The foldable electric cart has a frame assembly with a left side beam, a right side beam and a rear transverse beam integral with the left side beam and the right side beam. A rear transverse beam extends from the left side beam to the right side beam. A front transverse beam extends from the left side beam to the right side beam. To reduce weight the frame beams are preferably tubes. Additional transverse beams may be added.

A front foot support plate portion extends from the left side beam to the right side beam. The front foot support may extend rearward and downward from the front edge. A rear foot support plate portion extends from the left side beam to the right side beam and rearward from the front foot support plate portion to the rear transverse beam. The rear foot support plate portion is substantially horizontal. A bend is provided between the front foot support plate portion and rear foot support portion when both portions are made from one plate portion. A bend in the left side beam and the right side beam of the frame assembly is provided at the intersection of the two foot support plate portions. A rear edge of the rear support plate portion is secured to the rear transverse beam.

A vertical left side seat support plate is attached to the rear transverse beam and the rear beam. A vertical right side seat support plate is parallel to the vertical left side seat support plate and parallel to the right side beam. The vertical right side seat support plate is also attached to the rear transverse beam and the rear beam.

A rear lower tube is pivotally connected to the vertical left side seat support plate and the vertical right side seat support plate. A lower rear pin may hold the rear lower tube in place. A left rear arm is connected to the rear lower tube. A right rear arm is also connected to the lower rear tube. The connections between the left rear arm, the right rear arm and the rear lower tube may be made by welding.

A front lower tube is pivotally connected to the vertical left side seat support plate and the vertical right side seat support plate by a lower front pin that is parallel to and spaced from the lower rear pin. A left front arm is connected to the front lower tube. A right front arm is also connected to the front lower tube. A seat mount assembly is pivotally attached to the left rear arm and the right rear arm by one or more upper rear pivot pin. The seat mount assembly is also pivotally attached to the left front arm and the right front arm by at least one upper forward pivot pin. A seat bottom of the seat mount assembly is moveable between a substantially horizontal raised position above the frame assembly and a front lower tube and a substantially horizontal lowered position forward of the front lower tube. A seat back rest is pivotally attached to the seat bottom for pivotal movement between a substantially vertical use position and a substantially horizontal storage position.

A left vertical front plate is fixed to the frame assembly. A right vertical front plate is fixed to the frame assembly and spaced from the left vertical front plate.

A steering tube, with an attached yoke is journaled in a housing. The housing includes a left trunnion journaled in the left vertical front plate. The housing also includes a right trunnion journaled in the right vertical front plate. The left trunnion and the right trunnion are pivotally moveable about a transverse horizontal axis of the left trunnion and right trunnion. A steering handle base is clamped to the steering tube above the housing and the attached yoke.

A left tube is attached to the steering handle base. A right tube is also attached to the steering handle base. A left steering handle and a right steering handle are attached to the left tube and the right tube.

The housing is pivotal about the transverse horizontal axis of the housing between a steering use position and a steering storage position with the left steering handle and the right steering handle to the rear of the seat bottom when the seat bottom is in the substantially horizontal storage position.

A rear axle is attached to the frame assembly. A left rear wheel and tire is mounted on the rear axle. A right rear wheel and tire is also mounted on the rear axle.

A hub motor driven wheel and tier assembly is journaled on the yoke attached to the steering tube.

A rod, with a first rod end pivotally attached to the left front arm and a second rod end pivotally attached to the right front arm, has a transverse base that is received in one of a series of left vertical recesses in the vertical left side seat support plates and that is received in one of a series of the right vertical recesses in the vertical right side seat support plate to hold the horizontal seat in a selected position relative to the frame assembly.

An over center linkage assembly includes an arm pivotally attached to the housing, the left trunnion and the right trunnion has an arm free end engageable with the frame assembly. At least one short link has a link pivot end pivotally attached to the arm. A fixed end of the at least one short link has a fixed end pivotally attached to the frame assembly. A spring urges the link pivot end to a locking position of the over center linkage assembly. The spring is mounted on a bolt. One spring end engages a bolt head. A second spring end engages the arm pivotally attached to the housing and urges the arm free end toward engagement with the frame assembly when the bolt head engages the housing.

A bumper bar is mounted on the yoke attached to the steering tube and protects the hub motor driven wheel when the housing is in a steering use position. The bumper bar becomes a handle for moving the foldable electric cart when the housing is in the steering storage position.

The steering handle base clamped to the steering tube includes a left wing with a left wing half pipe surface that holds the left pip, a right wing with a right wing half pipe surface that holds the right pipe. The left wing half pipe surface and the right wing half pipe surface hold the left pipe and the right pipe forward relative to a bore in the steering handle base that receives the steering tube.

BRIEF DESCRIPTION OF DRAWINGS

The presently preferred embodiment of the invention is disclosed in the following description and in the following drawings, wherein.

DETAILED DESCRIPTION OF THE PREFERRED EMBODIMENTS

Figure 1:
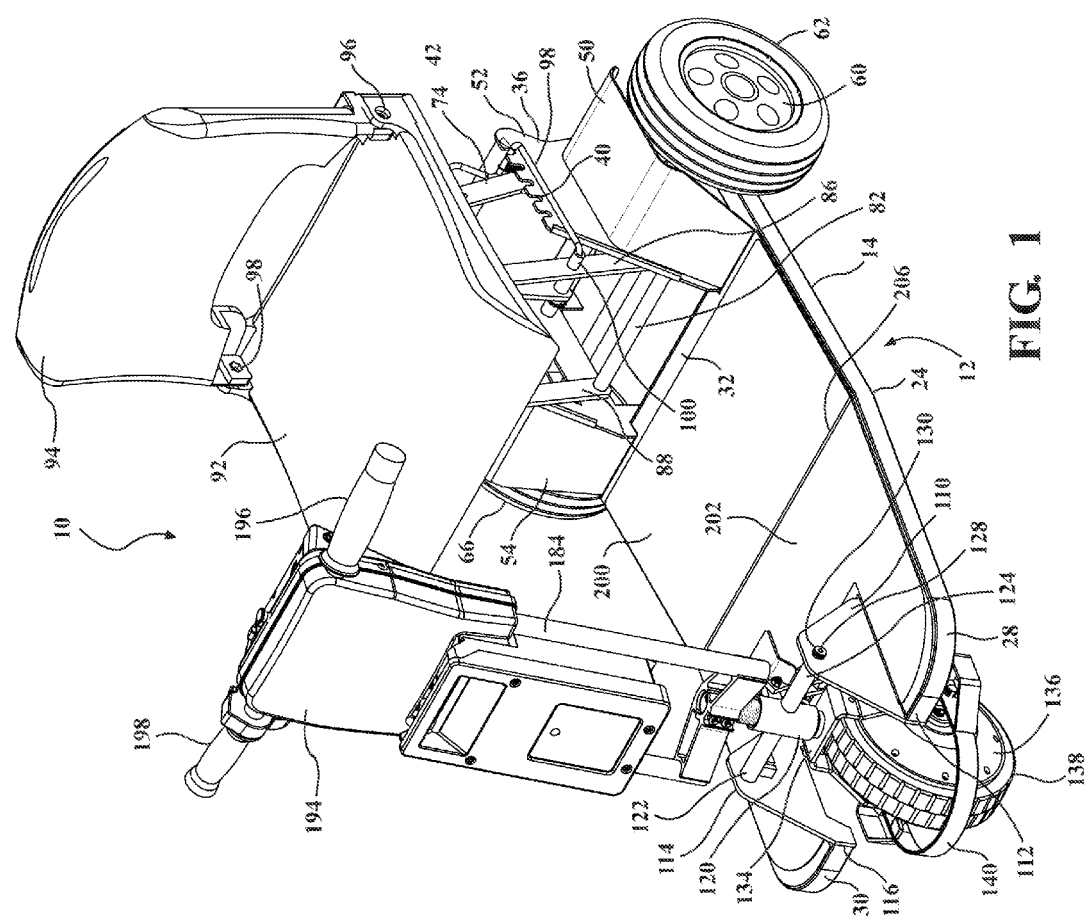
FIG. 1 is a perspective view of the foldable electric cart in an erected position ready for use.
Figure 2:
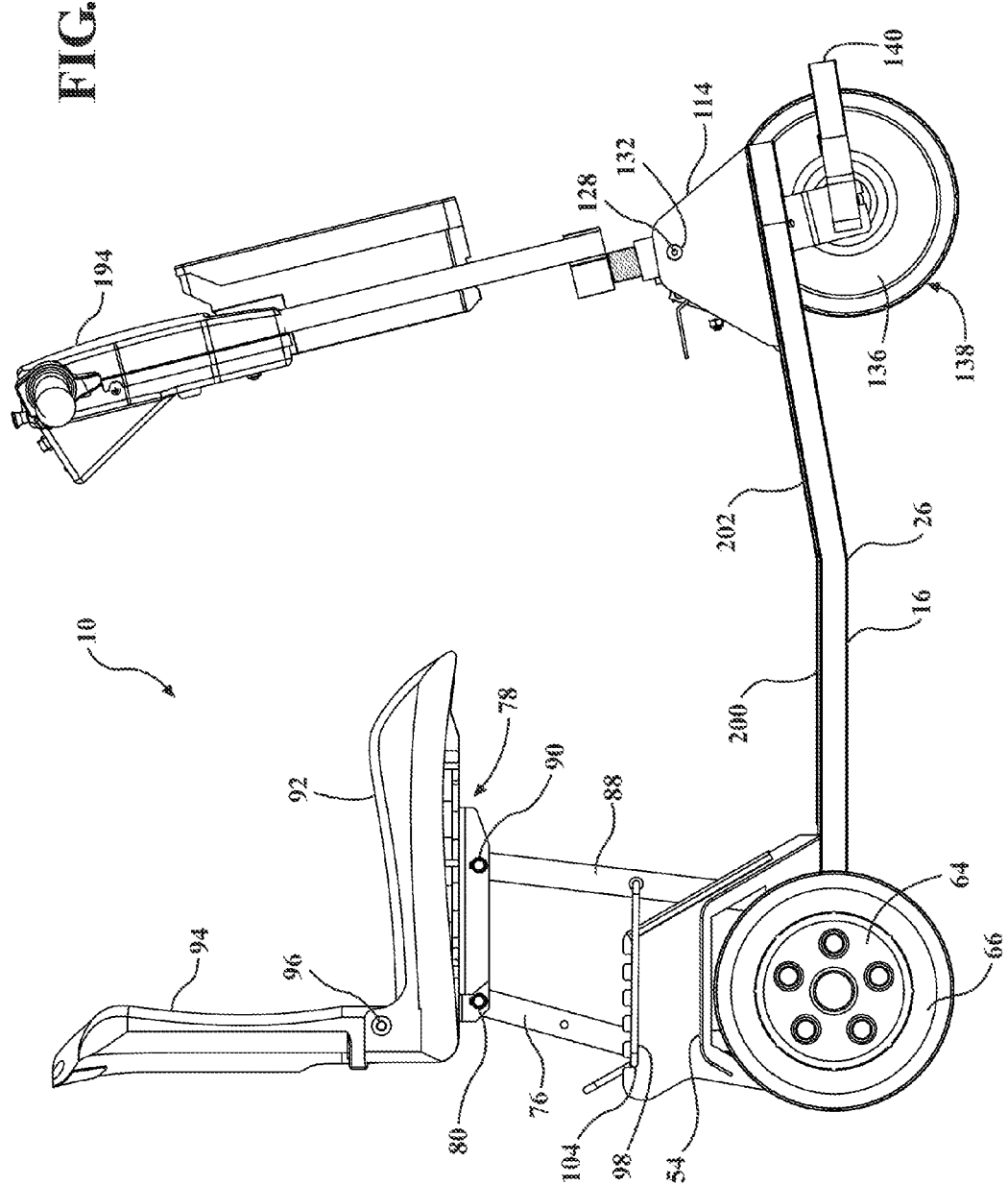
FIG. 2 is a right side elevational view of the foldable electric cart in the erected position.
Figure 3:
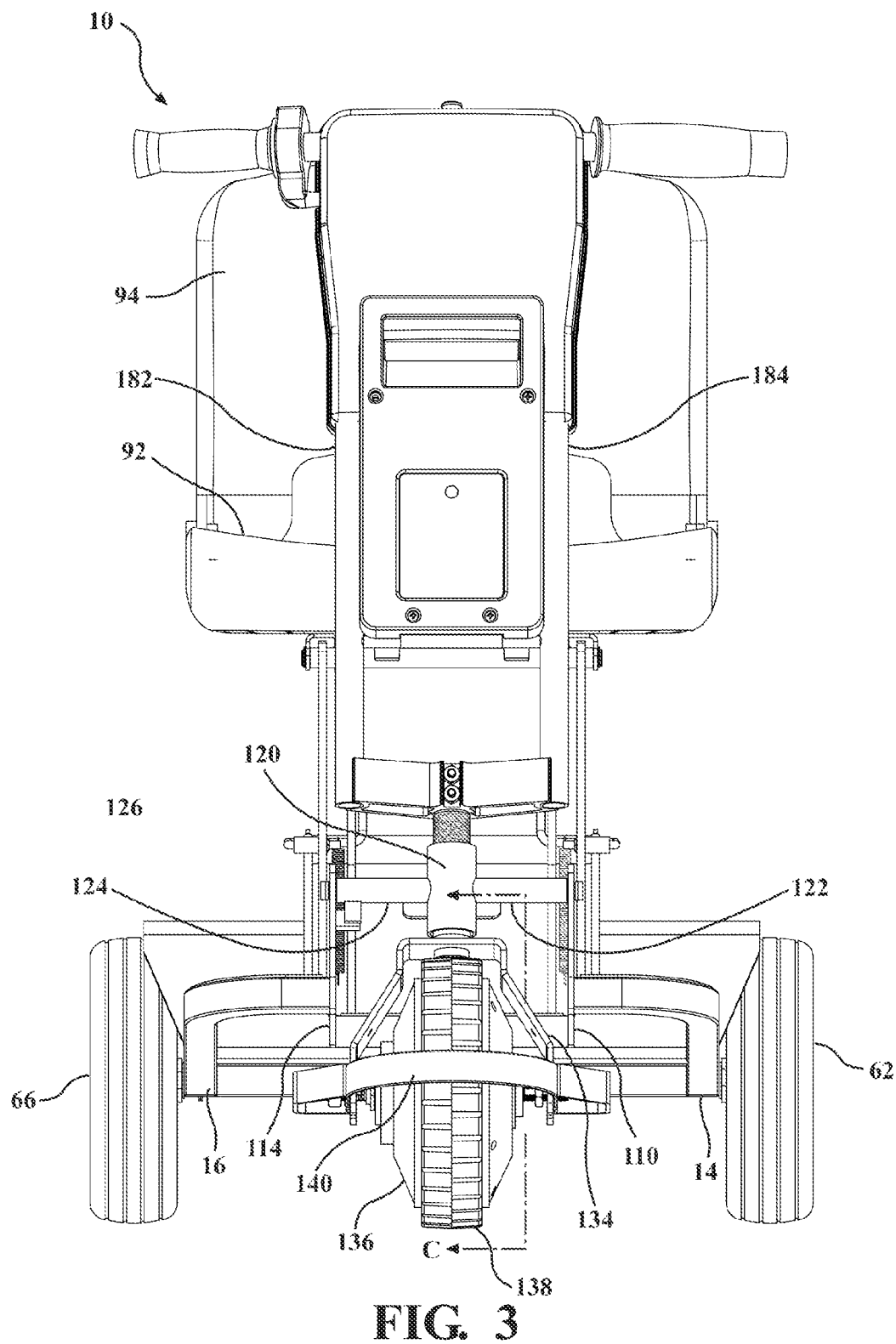
FIG. 3 is a front elevational view of the foldable electric cart in the erected position.

The foldable electric cart 10 includes a frame assembly 12. The frame assembly 12 includes a left side tubular beam 14, a right side tubular beam 16 and a rear tubular beam 18. The left side tubular beam 14 the right side tubular beam 16 and the rear tubular beam 18 are formed by bending one straight tubular beam. A ninety degree bend 20 is formed between the left beam 14 and the rear beam 18. A ninety degree bend 22 is formed between the right beam 16 and the rear beam 18. A bend 24 is provided in the left side tubular beam 14. A bend 26 is provided in the right side tubular beam 16. A left front tubular bend 28 of ninety degrees is provided in the left side tubular beam 14. A right front tubular bend 30 of ninety degrees is provided in the right side tubular beam 16.

A rear transverse tubular beam 32 is parallel to the rear tubular beam 18 and forward of the rear tubular beam. The rear transverse tubular beam 32 is welded to the left side tubular beam 14. The rear transverse tubular beam 32 is also welded to the right side tubular beam 16. A front transverse tubular beam 34 is forward of the bend 24 in the left side tubular beam 14 and forward of the bend 26 in the right side tubular beam 16. The front transverse tubular beam 34 is also spaced to the rear of the left front tubular bend 28 and the right front tubular bend 30. One end of the front transverse beam 34 is welded to the right side beam 16. The other end of the front transverse beam 34 is welded to the left side tubular beam 14.

A vertical left side seat support plate 36 is fixed to the rear tubular beam 18 and the rear transverse tubular beam 32 by welding. A vertical right side support plate 38 is fixed to the rear tubular beam 18 and the rear transverse tubular beam 32 by welding. The vertical left seat support plate 36 and the vertical right seat support plate 38 are parallel to each other and to the left side tubular beam 14 and the right side tubular beam 16.

A series of left vertical recesses 40 are provided in the top edge 42 of the left seat support plate 36. The vertical recesses 40 are spaced apart in a fore and aft direction. A series of right vertical recesses 44 are provided in the top edge 46 of the right seat support plate 38. The vertical recesses 44 are in transverse alignment with the left vertical recesses 40. A horizontal transverse bar 48 extends from the vertical left side seat support plate 36 to the vertical right side support plate 38. The horizontal transverse bar 48 is fixed to both seat support plate 36 and 38 adjacent to the top edge 42 and the top edge 46.

A left rear fender 50 is fixed to an outboard side 52 of the left seat support plate 36. A right rear fender 54 is fixed to an outboard side 56 of the right seat support plate 38.

A rear axle 58 passes through the left side tubular beam 14 and the right side tubular beam 16. A left rear wheel 60 and tire 62 is journaled on the rear axle 58 outboard of the left side tubular beam 14 and below and to the rear of the left fender 50. A right rear wheel 64 and tire 66 is journaled on the rear axle 58 outboard of the right side tubular beam 16 and below and to the rear of the right rear fender 54.

A rear lower tube 70 is pivotally attached to the vertical left side seat support plate 36 and the right side seat support plate 38 by a lower rear pin 72. A left rear arm 74 has a lower end fixed to the rear lower tube 70. A right rear arm 76 has a lower end fixed to the rear lower tube 70. Upper ends of the left rear arm 74 and the right rear arm 76 are pivotally attached to a seat mount assembly 78 by an upper rear pivot pin 80.

A front lower tube 82 is pivotally attached to the vertical left side seat support plate 36 and the right side seat support plate 38 by a lower front pin 84. A left front arm 86 has a lower end fixed to the front lower tube 82. A right front arm 88 has a lower end fixed to the front lower tube 82. Upper ends of the left front arm 86 and the right front arm 88 are pivotally attached to a seat mount assembly 78 by an upper forward pivot pin 90.

A seat bottom 92 is attached to the seat mount assembly 78 by mechanical fasteners. A seat back rest 94 is pivotally attached to the seat bottom 92 by pivot pins 96. The seat back rest 94 pivots about pivot pins 96 between a generally vertical use position shown in FIG. 1 and a storage position shown in FIG. 5.

Figure 6:
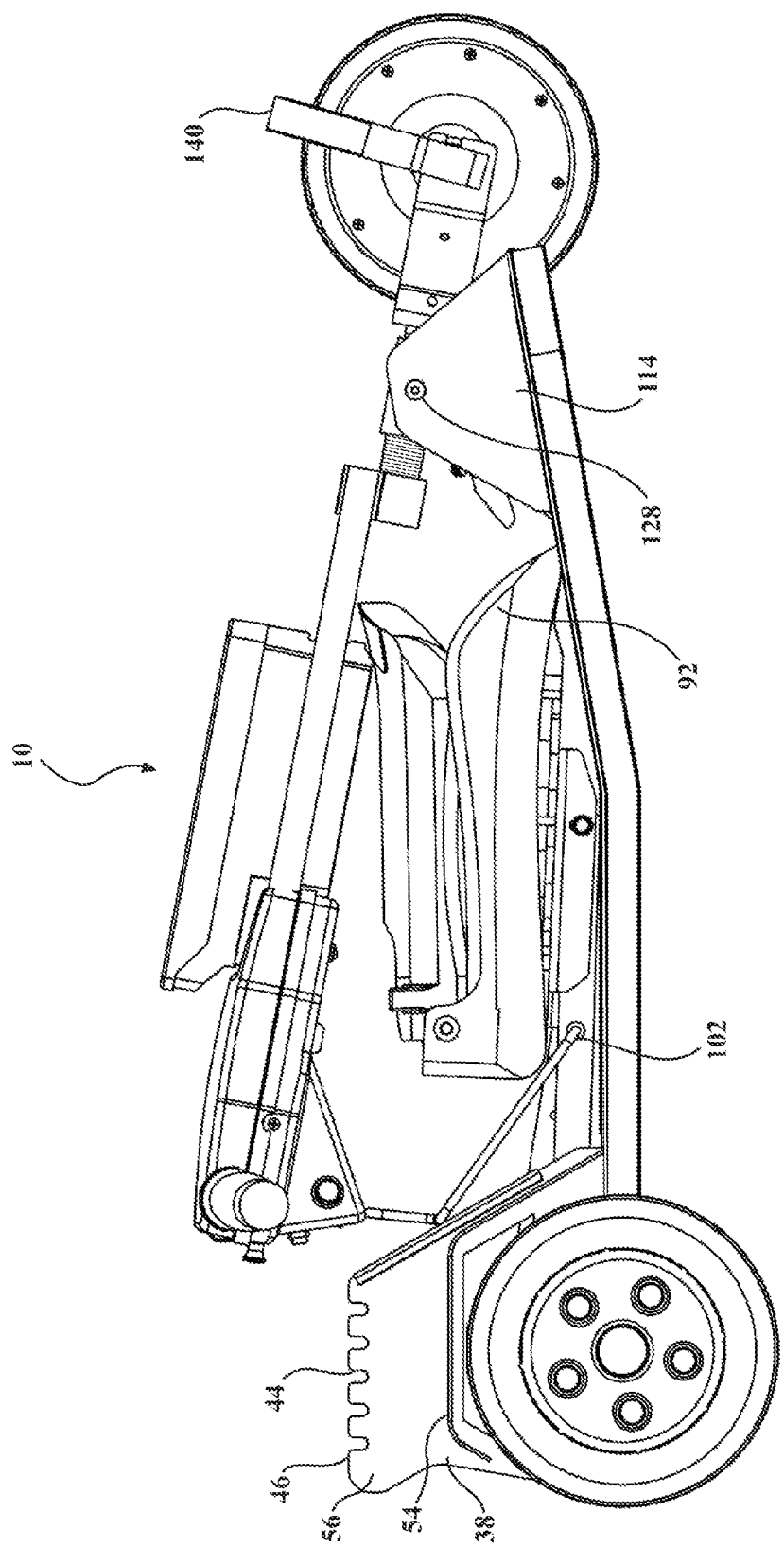
FIG. 6 is a left side elevational view of the electric cart in a collapsed storage position.
Figure 7:
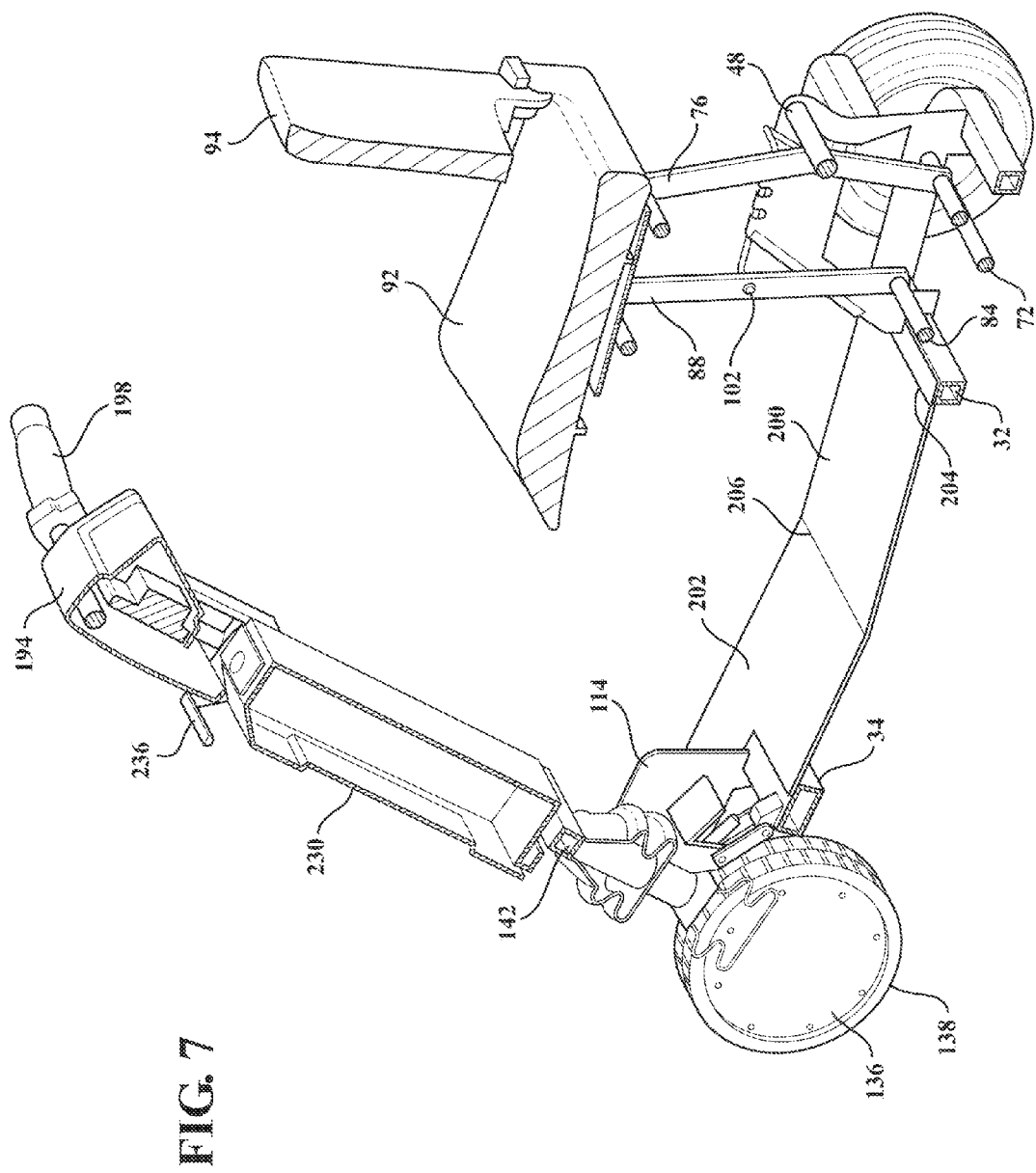
FIG. 7 is perspective view, with the left side removed, of the electric cart in the erected position.

The left rear arm 74, the right rear arm 76, the left front arm 86 and the right front arm 88 permit movement of the seat bottom 92 between a generally horizontal use position sown in FIG. 1 and a generally horizontal storage position shown in FIG. 6. A spring steel U-shaped rod 98 has rod ends 100 and 102. The rod end 100 is pivotally attached to the left front arm 86. The rod end 102 pivotally attached to the right front arm 88. When the transverse base 104 of the U-shaped rod 98 is lifted from vertical recesses 40 and 44 the seat bottom 92 is free to be moved to the storage position. When the base 104 of the U-shaped rod 98 is inserted in a vertical recess 40 and an aligned vertical recess 44 the seat bottom 32 is held in a generally horizontal use position. The transverse base 104 of the U-shaped rod 98 can be moved to different pairs of transversely aligned vertical recesses 40 and 44 to move the seat bottom forward or rearward.

A left vertical front plate 110 is fixed to a free end 112 of the left side tube 14 and to the transverse beam 34. A right vertical front plate 114 is fixed to a free end 116 of the right side tube 16 and to the transverse beam 134. The left vertical front plate 110 and the right vertical front plate 114 are spaced apart and parallel to each other.

Figure 9:
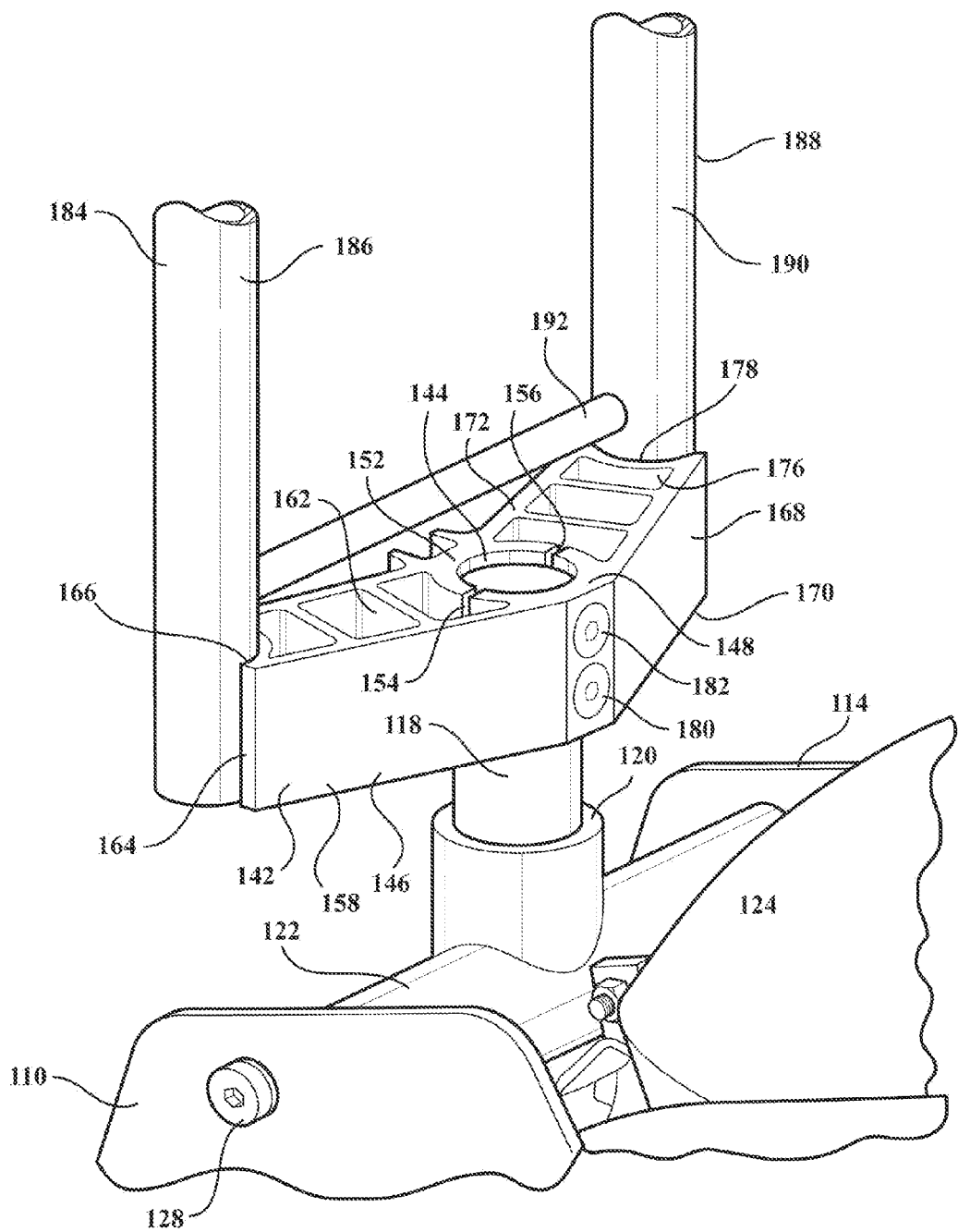
FIG. 9 is an enlarged perspective view of the connection of a handle bar assembly to the steering tube with parts broken away.

A steering tube 118 shown in FIG. 9 is journaled in a housing 120. The housing 120 has a left trunnion 122 and a right trunnion 124. The trunnions 122 and 124 provide a transverse horizontal axis 126. Pins 128 screw into threaded bores 130 and 132 in the left trunnion 122 and the right trunnion 124. The heads of the pins 128 are received in bores through the left vertical plate 110 and the right vertical plate 114 and pivotally support the housing 120 for pivotal movement about the transverse horizontal axis 126. A yoke 134 is fixed to the lower end of the steering tube 118. A hub motor 136 and driven wheel 138 are mounted on the yoke 134. A bumper bar 140 is attached to the yoke 134.

A steering handle base 142 includes a bore 144 that receives the steering tube 118. A left wing 146 is integral with a central block 148 that includes the bore 144. The central block 148 includes a rear block portion 150 and a front block portion 152. Slots 154 and 156 separate the bore 144 into two halves. The left wing 146 includes a rear bar portion 158 and a front bar portion 160 separated by integral web members 162. Outboard ends of the rear bar portion 158 and the front bar portion 160 are connected together by an integral end portion 164 with a half pipe surface 166 that faces away from the bore 144.

A right wing 168 includes a rear bar portion 170 and a front bar portion 172 separated by integral web members 174. Outboard ends of the rear bar portion 170 and the front bar portion 172 are connected together by an integral end portion 176 with a half pipe surface 178 that faces away from the bore 144.

Bolts 180 and 182 pass through center block 148, the bore 144 and the steering tube 118 and into threaded bores in the front block portion 152. The slots 154 and 156 permit the bolts 180 and 182 to force the rear block portion 150 and the front block 152 portion toward each other and insure that there is no movement between the steering handle base 142 and the steering tube 118.

A left tube 184 has a cylindrical surface 186 that engages the half pipe surface 166 of steering handle base 142. The right tube 188 has a cylindrical surface 190 that engages the half pipe surface 178 of the steering handle base 142. A cross member 192 holds the lower ends of the left tube 184 and the right tube 188 in engagement with the respective half pipe surfaces 166 and half pipe surface 178 to created rigid connections. The left wing 146 and the right wing 168 extend radially outward and forward relative to the central block 148 and move the cross member 192 forward relative to the steering tube 118. This forward movement permits the rear axle 58 to be moved forward while maintaining the maximum space for an operator.

A control panel 194 is connected to the upper ends of the left tube 184 and the right tube 188. A left steering handle 196 and a right steering handle 198 are also connected to the upper ends of left tube 184 and the right tube 188.

Foot support plate portions 200 and 202 are secured to the frame assembly 12. The foot plate portion 200 is fixed to the horizontal portion of the left side tubular beam 14 and the right side tubular beam 16. A rear edge 204 of the foot plate portion 200 is fixed to the rear transverse tubular beam 32. The foot plate portion 202 extends forward from the transverse tubular beam 32 to the bend 24 in the left side tubular beam 16 and to the bend 26 in the right side tubular beam 16. The foot support plate portion 202 extends forwardly and upwardly from the bends 24 and 26, in the left and right side tubular beams 14 and 16, to the front end of the frame assembly 12. Preferably the foot support plate portion 200 and the foot plate portion 202 are one piece with a foot support plate bend 206.

Figure 8:
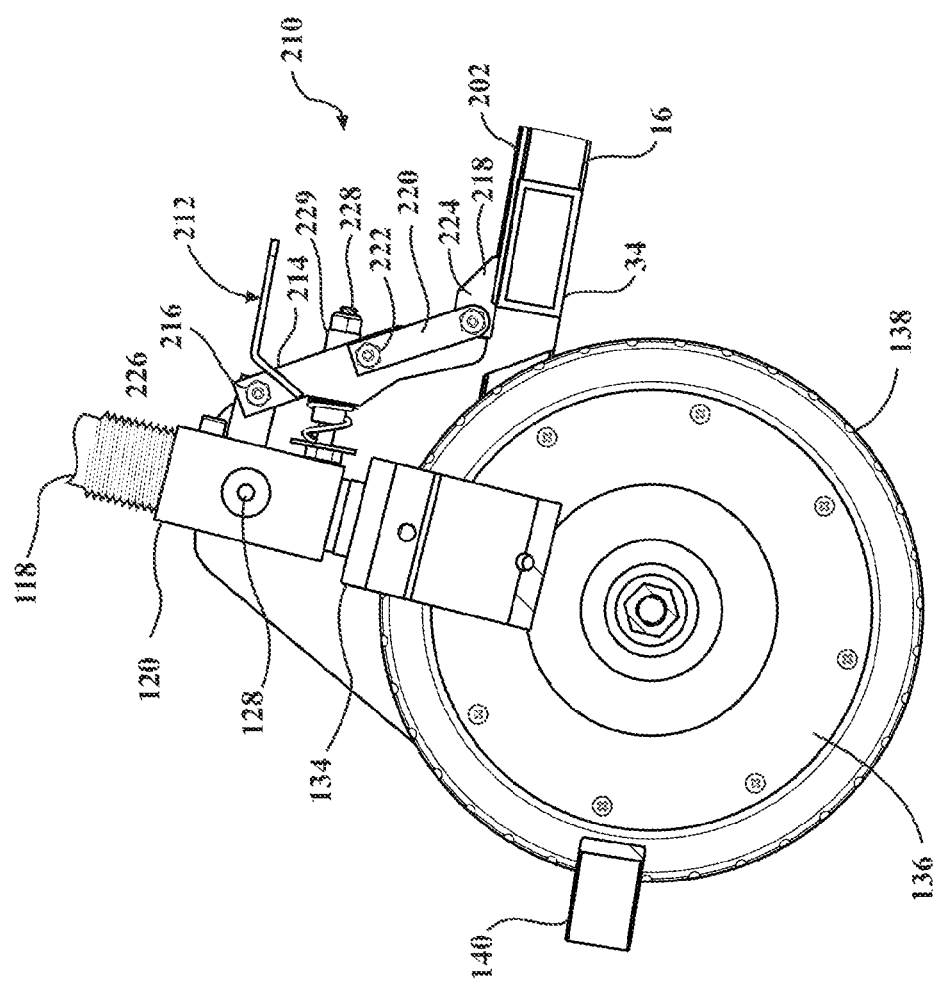
FIG. 8 is an enlarged side elevational view of the front wheel lock assembly, with the front wheel in the erected position, and parts broken away.

An over center linkage assembly 210, shown in FIG. 8, locks the housing 120 in a fixed position relative to the transverse horizontal axis 126 during use.

The over center linkage assembly 210 includes a long arm 214. The long arm 214 has an upper end pivotally attached to the housing 120 by a bolt 216. The lower end of the long arm 214 contacts a block 218 that is fixed to the front transverse tubular beam 34 of the frame assembly 12. A pair of parallel short links 220 is pivotally attached to opposite sides of the long arm 214 by a bolt 222. The pair of parallel short links 220 are also pivotally attached to the block 218 by a bolt 224. The bolt 222 is to the right of a plane including the axis of the bolt 224 and the bolt 216. A compression coil spring 226 holds the arm 214 and the pair of parallel short links 220 in the locked position shown in FIG. 8.

Pressing on a lever 212 downward rotates arm 214 about bolt 216 compressed coil spring 226 and unlocks the linkage assembly 210.

As the housing 120 pivots clockwise about the transverse horizontal axis 126, as shown in FIG. 8, the bolt 228 through tube 229 retains the coil spring 226. The tube 229 is fixed to the arm 214 and positions the head of bolt 228 to engage the housing 120 as the housing is returned to an operating position.

Figure 4:
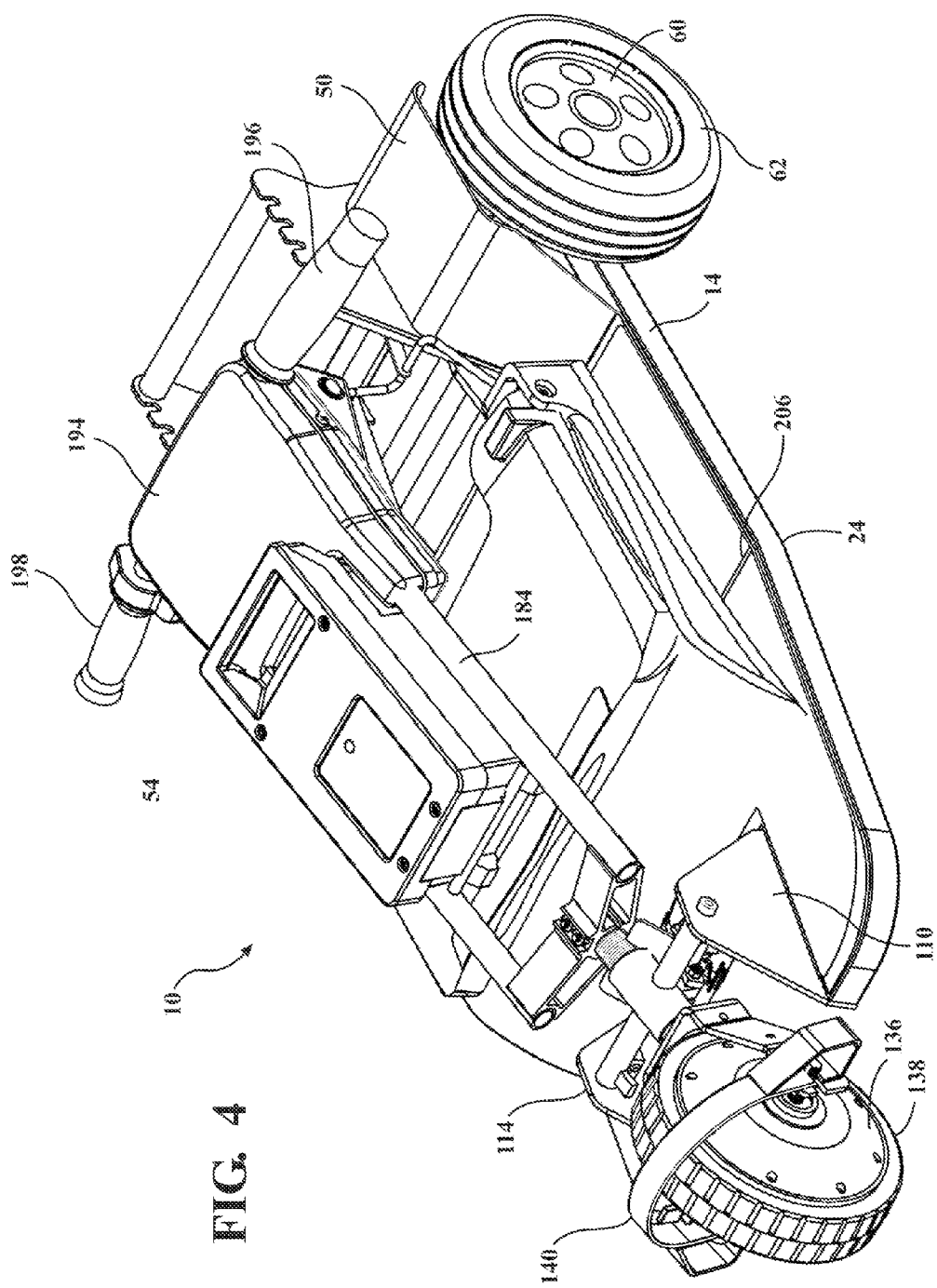
FIG. 4 is a perspective view of the foldable electric cart, cart left side and front in a collapsed storage position.
Figure 5:
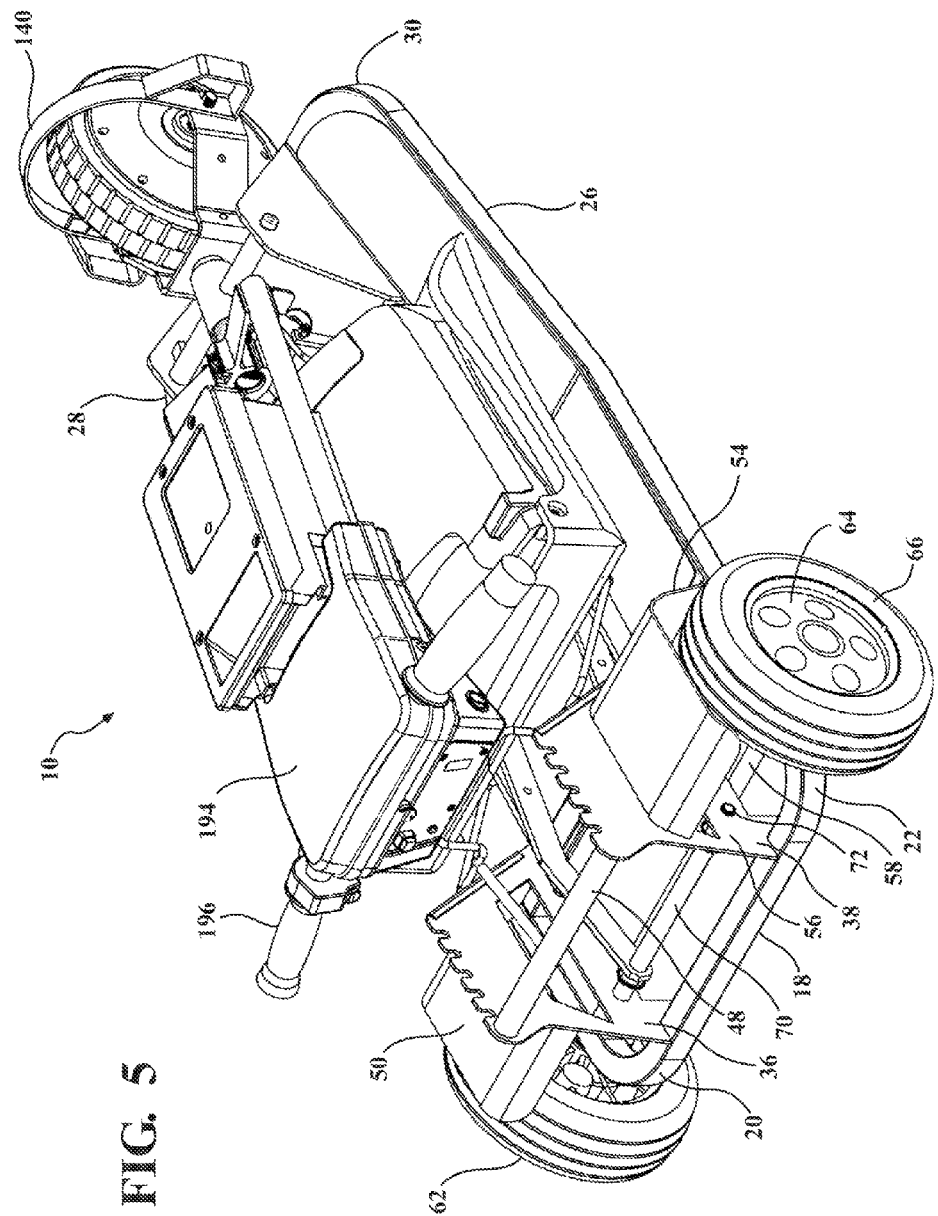
FIG. 5 is a perspective view of the foldable electric cart, cart right side and rear in a collapsed storage position.

Once the over center linkage assembly 210 is unlocked, the control panel 194 is moved rearwardly and downward to rotate the housing 120 to the storage position shown in FIGS. 4 through 6. A retainer (not shown) is provided to hold the control panel 194 in the storage position.

A battery and battery container 230 for powering the hub motor 136 is mounted between the left tube 184 and the right tube 188 of the steering assembly. The bottom 232 of the battery is supported on the cross member 192. After the bottom 232 engages the cross member 192, the battery is pivoted about the cross member 192 to move the battery top 234 under the control panel 194. A latch 236 on the control panel 194 engages the battery 230 and locks the battery in place. The latch may be a hook and loop connector.

The battery and battery container 230 has substantial weight. It may therefore be desirable to separate the battery when transporting the foldable electric cart in a larger vehicle. The foldable electric cart is unloaded from a larger vehicle or removed from a storage area and then the battery and battery container is attached. The cart may be moved by employing the front bumper bar 140 as a handle and moving the cart on the left rear wheel 60 and tire 62 and the right rear wheel 64 and tire 66.

To prepare the electric cart 10 for use, the control panel 194 in pivoted upward and forward about the transverse horizontal axis 126 to a use position. The linkage assembly 210 automatically locks the control panel 194 is a use position. The seat bottom 92 is lifted up and to the rear. The spring steel U-shaped rod 98 moves into vertical recesses 40 and 44 to lock the seat bottom 92 in a selected use position. The seat back rest 94 is then pivoted upward to a use position. The battery and battery container 230 is moved into engagement with the cross member 192 and then pivoted toward the control panel 194. The control panel 194 is plugged into the battery. The foldable electric cart is ready for use after the above activities are completed.

The steered and driven wheel 138 pivots about the transverse horizontal axis 126 of the housing 120. The axis 126, of the trunnions 122 and 124, is positioned well above the driven wheel 138 when the housing 120 is locked in a use position. Pivoting the housing 120 to a storage position moves the driven wheel 138 upward and forward relative to the frame assembly 12. This shifting of the position of the driven wheel 138 lowers the vertical height of the folded cart substantially when the cart 10 is folded for storage as shown in FIG. 6. The vertical height of the front portion of the cart 10 is a little over the vertical height of the driven wheel 138. The vertical height of the rear portion of the cart 10 folded for storage position is substantially less than two times the diameter of a rear tire 62. However, the length of the cart 10 in a folded storage condition is increased some.

We claim:

1. A foldable electric cart comprising:

a frame assembly including a left side beam, a right side beam, a rear beam integral with the left side beam and the right side beam, a rear transverse beam extending from the left side beam to the right side beam, a front transverse beam extending from the left side beam to the right side beam, a front foot support plate portion extending from the left side beam to the right side beam, and a rear foot support plate portion extending from the left side beam to the right side beam;

a vertical left side seat support plate attached to the frame assembly, and spaced from the left side beam;

a vertical right side seat support plate attached to the frame assembly, spaced from the left side beam and parallel to the left side beam;

a rear lower tube pivotally connected to the vertical left side seat support plate and the vertical right side seat support plate by a lower rear pin, a left rear arm connected to the rear lower tube, a right rear arm connected to the lower rear tube, a front lower tube pivotally connected to the vertical left side seat support plate and the vertical right side seat support plate by a lower front pin that is parallel to and spaced from the lower rear pin, a left front arm connected to the front lower tube, right front arm connected to the front lower tube, a seat mount assembly pivotally attached to the left rear arm and the right rear arm by an upper rear pivot pin, pivotally attached to the left front arm and the right front arm by an upper forward pivot pin, a seat bottom of the seat mount assembly moveable between a horizontal raised position above the frame assembly and a front lower tube and a horizontal lowered position forward of the lower front pin, and a seat back rest pivotally attached to the seat bottom for pivotal movement between a substantially vertical use position and a substantially horizontal storage position;

a left vertical front plate fixed to the frame assembly, and a right vertical front plate fixed to the frame assembly and spaced from the left vertical front plate;

a steering tube, with an attached yoke, journaled in a housing, the housing including a left trunnion journaled in the left vertical front plate a right trunnion journaled in the right vertical front plate for pivotal movement about a transverse horizontal axis of the left trunnion and the right trunnion, a steering handle base clamped to the steering tube above the housing and the attached yoke;

a left tube attached to the steering handle base, a right tube attached to the steering handle base, a left steering handle and a right steering handle attached to the left tube and the right tube and wherein the housing is pivotal about the transverse horizontal axis of the housing between a steering use position and a steering storage position with the left steering handle and the right steering handle to the rear of the seat bottom when the seat bottom is in the substantially horizontal storage position;

a rear axle attached to the frame assembly, a left rear wheel and tier mounted on the rear axle, and a right rear wheel and tire mounted on the rear axle; and a hub motor driven wheel journaled on the yoke attached to the steering tube.

2. A foldable electric cart, as set forth in claim 1, including a rod that holds the left front arm and the right front arm and the attached seat bottom in the horizontal raised position during use of the foldable electric cart.

3. A foldable electric cart, as set forth in claim 1, including a rod with one rod end pivotally attached to the left front arm, a second rod end pivotally attached to the right front arm and a transverse base that is received in one of a series of left vertical recesses in the vertical left side seat support plate and that is received in one of a series of right vertical recesses in the vertical right side seat support plate.

4. A foldable electric cart, as set forth in claim 1, including an over center linkage assembly including an arm pivotally attached to the housing the left trunnion and the right trunnion and having an arm free end engageable with the frame assembly, at least one short link with a link pivot end pivotally attached to the arm and pivotally attached to the frame assembly, and a spring that urges the link pivot end to a locking position of the over center linkage assembly.

5. A foldable electric cart, as set forth in claim 4 wherein the spring is mounted on a bolt one spring end engaging a bolt head and a second spring end engaging the arm pivotally attached to the housing and urging the arm free end toward engagement with the frame assembly when the bolt head engages the housing.

6. A foldable electric cart, as set forth in claim 1, including a bumper bar mounted on the yoke attached to the steering tube and protecting the hub motor driven wheel when the housing is in the steering use position and wherein the bumper bar becomes a handle for moving the foldable electric cart when the housing is in the steering storage position.

7. A foldable electric cart, as set forth in claim 1, wherein the steering handle base clamped to the steering tube includes a left wing with a left wing half pipe surface, that holds the left pipe, a right wing with a right wing half pipe surface that holds the right pipe and wherein the left wing half pipe surface and the right wing half pipe surface hold the left pipe and the right pipe forward relative to a bore in the steering handle base that receives the steering tube.

8. A foldable electric cart, as set forth in claim 1, including a battery container mounted between the left tube and the right tube attached to the steering handle base.

9. A foldable electric cart comprising:

a frame assembly including a left beam, a right beam, a rear beam integral with the left beam and the right beam, a rear transverse beam extending from the left beam to the right beam, a front transverse beam extending from the left beam to the right beam, a front foot support plate portion extending from the left beam to the right beam, and a rear foot support plate portion extending from the left beam to the right beam;

a left seat support plate attached to the frame assembly, and a right seat support plate attached to the frame assembly and spaced from the left seat support plate;

a rear tube pivotally connected to left seat support plate and to the right seat support plate, a left rear arm connected to the rear tube, a right rear arm connected to the rear tube, a front tube pivotally connected to the left seat support plate and the right seat support plate, a left front arm connected to the front tube, a right front arm connected to the front tube, a seat mount pivotally attached to the left rear arm and the right rear arm, to the left front arm and the right front arm, a seat bottom mounted on the seat mount moveable between a horizontal raised position above the frame assembly and a horizontal lowered position forward of the front tube, and a seat back rest pivotally attached to the seat bottom for pivotal movement between a substantially vertical position and a substantially horizontal position;

a left vertical front plate fixed to the frame assembly, a right vertical front plate fixed to the frame assembly and spaced from the left vertical front plate;

a steering tube, with an attached yoke, journaled in a housing, including a left trunnion journaled in the left vertical front plate, a right trunnion journaled in the right vertical front plate for pivotal movement about a transverse horizontal axis of the left trunnion and the right trunnion, a steering handle base clamped to the steering tube above the housing and the attached yoke, a left tube attached to the steering handle base, a left steering handle and a right steering handle attached to the left tube and the right tube and wherein the housing is pivotal about the transverse horizontal axis of the housing between a steering use position and a steering storage position with the left steering handle and the right steering handle to the rear of the seat bottom when the seat bottom is in the substantial horizontal storage position;

said steering handle base includes a left wing with a left wing half pipe surface that holds the left pipe, a right wing with a right wing half pipe surface that holds the right pipe and wherein the left wing half pipe surface and the right wing half pipe surface hold the left pipe and the right pipe forward relative to a bore in the steering handle base that receives the steering tube;

a rear axle attached to the frame assembly, a left rear wheel and tire mounted on the rear axle, and a right rear wheel and tire mounted on the rear axle; and a hub motor driven wheel journaled on the yoke.

10. A foldable electric cart, as set forth in claim 9, including a rod that holds the left front arm and the right front arm and the attached seat bottom in the horizontal raised position during use of the foldable electric cart.

11. A foldable electric cart, as set forth in claim 9, including a rod with one rod end pivotally attached to the left front arm, a second rod end pivotally attached to the right front arm and a transverse base that is received in one of a series of left vertical recesses in the vertical left side seat support plate and that is received in one of a series of right vertical recesses in the vertical right side seat support plate.

12. A foldable electric cart, as set forth in claim 9, including an over center linkage assembly including an arm pivotally attached to the housing the left trunnion and the right trunnion and having an arm free end engageable with the frame assembly, at least one short link with a link pivot end pivotally attached to the arm and pivotally attached to the frame assembly, and a spring that urges the link pivot end to a locking position of the over center linkage assembly.

13. A foldable electric cart, as set forth in claim 12 wherein the spring is mounted on a bolt one spring end engaging a bolt head and a second spring end engaging the arm pivotally attached to the housing and urging the arm free end toward engagement with the frame assembly when the bolt head engages the housing.

14. A foldable electric cart, as set forth in claim 9, including a bumper bar mounted on the yoke attached to the steering tube and protecting the hub motor driven wheel when the housing is in the steering use position and wherein the bumper bar becomes a handle for moving the foldable electric cart when the housing is in the steering storage position.

15. A foldable electric cart, as set forth in claim 9, including a battery container mounted between the left tube and the right tube attached to the steering handle base.

* * * * *